United States Patent
Medina et al.

(10) Patent No.: US 7,333,295 B1
(45) Date of Patent: Feb. 19, 2008

(54) MAGNETIC RECORDING HEAD WITH HIGH SATURATION MAGNETIC FLUX DENSITY CONIFE THIN FILM COMPOSITION

(75) Inventors: Jose A. Medina, Pleasanton, CA (US); Thomas E. Dinan, San Jose, CA (US); Tiffany Yun Wen Jiang, San Francisco, CA (US); Mohamad T. Krounbi, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 230 days.

(21) Appl. No.: 10/815,494

(22) Filed: Mar. 31, 2004

(51) Int. Cl.
*G11B 5/31* (2006.01)
(52) U.S. Cl. .................................... 360/126
(58) Field of Classification Search ............... 360/126, 360/317
See application file for complete search history.

(56) References Cited

U.S. PATENT DOCUMENTS

| | | | |
|---|---|---|---|
| 4,053,373 A | | 10/1977 | McMullen et al. |
| 6,090,269 A | | 7/2000 | Mandler et al. |
| 6,132,892 A | * | 10/2000 | Yoshikawa et al. ......... 428/812 |
| 6,183,889 B1 | * | 2/2001 | Koshiba et al. ............. 360/126 |
| 6,678,125 B2 | | 1/2004 | Nikitin et al. |
| 2002/0155321 A1 | * | 10/2002 | Kawasaki et al. .......... 428/692 |
| 2003/0048582 A1 | * | 3/2003 | Kanada et al. .............. 360/126 |
| 2003/0095357 A1 | * | 5/2003 | Kudo et al. ................. 360/126 |
| 2004/0101712 A1 | * | 5/2004 | Kudo et al. ................. 428/692 |

* cited by examiner

*Primary Examiner*—Craig A. Renner
(74) *Attorney, Agent, or Firm*—Strategic Patent Group

(57) ABSTRACT

A method and system for plating CoNiFe is disclosed. The method and system include providing a plating solution including hydroxymethyl-p-tolylsulfone and plating the CoNiFe film on a substrate in the plating solution. The plating solution is configured to provide a CoNiFe film having a high saturation magnetic flux density and having a composition of 50-70 weight percent of Fe and 3-8 weight percent of Ni. In another aspect, the method and system include plating at least a portion of a first and/or second pole of a write head using the plating solution including hydroxymethyl-p-tolylsulfone and configured to plate the CoNiFe film having a high saturation magnetic flux density and a composition of 50-70 weight percent of Fe and 3-8 weight percent of Ni.

5 Claims, 9 Drawing Sheets

$B_{Sat}$ of CoNiFe Films vs. Fe Content for hydroxymethyl-p-tolylsulfone concentrations of 5ppm (circles), 15 ppm (squares), and 25 ppm (triangles)

Easy Axis Coercivity of CoNiFe Films vs. Fe Content for hydroxymethyl-p-tolylsulfone concentrations of 5ppm (circles), 15 ppm (squares), and 25 ppm (triangles)

Hard Axis Coercivity of CoNiFe Films vs. Fe Content for hydroxymethyl-p-tolylsulfone concentrations of 5ppm (circles), 15 ppm (squares), and 25 ppm (triangles)

165

Hard Axis Anisotropy Field of CoNiFe Films vs. Fe Content for hydroxymethyl-p-tolylsulfone concentrations of 5ppm (circles), 15 ppm (squares), and 25 ppm (triangles)

Resistivity of CoNiFe Films vs. Fe Content for hydroxymethyl-p-tolylsulfone concentrations of 5ppm (circles), 15 ppm (squares), and 25 ppm (triangles)

175

Stress of CoNiFe Films vs. Fe Content for hydroxymethyl-p-tolylsulfone concentrations of 5ppm (circles), 15 ppm (squares), and 25 ppm (triangles)

Magnetostriction of CoNiFe Films vs. Fe Content for hydroxymethyl-p-tolylsulfone concentrations of 5ppm (circles), 15 ppm (squares), and 25 ppm (triangles)

MAGNETIC RECORDING HEAD WITH HIGH SATURATION MAGNETIC FLUX DENSITY CONIFE THIN FILM COMPOSITION

FIELD OF THE INVENTION

The present invention relates to magnetic recording technology, and more particularly to a method and system for providing plated CoNiFe films having improved magnetic properties.

BACKGROUND OF THE INVENTION

FIG. 1 depicts a conventional write head 10, which is typically incorporated into a merged head (not shown) including the conventional write head 10 and a conventional read head (not shown). The conventional write head includes a conventional first pole (P1) 20, a conventional write coil 30 insulated by insulating layer 32, a conventional write gap 40, and a conventional second pole (P2) 50. The conventional P1 20 and the conventional P2 50 are separated by the conventional write gap 40 in the region of the pole tip. The conventional P1 20 and the conventional P2 50 are typically composed of ferromagnetic materials. The write coil 30 is used to carry a coil which energizes P1 20 and P2 50 during writing. The insulating layer 32 is typically a hardbaked photoresist.

In order to improve the ability of the conventional write head 10 to write to higher density media (not shown), it is desirable for at least a portion of the conventional P1 20 and the conventional P2 50 have a high saturation magnetic flux density ($B_{sat}$) and a low coercivity. A material can be considered to have high $B_{sat}$ when the $B_{sat}$ is above 2 Tesla. A material can be considered to be soft, having a low coercivity, when the coercivity is less than approximately thirty Oe. To fabricate such high $B_{sat}$, soft ferromagnetic materials, the P1 20 and P2 50 are typically plated. A variety of soft ferromagnetic materials having the high $B_{sat}$ have been explored for use in poles such as P1 20 and P2 50. In particular, CoFe and, to a lesser extent, CoNiFe have been investigated. Bulk CoFe has a high $B_{sat}$, values of up to 2.4 T have been reported. However, CoFe alloys may have a higher coercivity. In addition, the CoFe are subject to corrosion, which is undesirable for conventional write heads 10. Plated CoNiFe has been investigated. For example, U.S. Pat. No. 4,053,373 discusses plating of CoNiFe in a variety of solutions, including those containing hydroxymethyl-p-tolylsulfone. However, there is no indication that CoNiFe having both sufficiently high $B_{sat}$ and the desired softness have been obtained.

Accordingly, what is needed is a system and method for obtaining a soft high $B_{sat}$ plated material that may be suitable for use in write heads. The present invention addresses such a need.

SUMMARY OF THE INVENTION

The present invention provides a method and system for plating CoNiFe. The method and system include providing a plating solution including hydroxymethyl-p-tolylsulfone and plating the CoNiFe film on a substrate in the plating solution. The plating solution is configured to provide a CoNiFe film having a high saturation magnetic flux density and having a composition of fifty through seventy weight percent of Fe and three through eight weight percent of Ni. In another aspect, the method and system include plating at least a portion of a first and/or second pole of a write head using the plating solution including hydroxymethyl-p-tolylsulfone and configured to plate the CoNiFe film having a high saturation magnetic flux density and a composition of fifty through seventy weight percent of Fe and three through eight weight percent of Ni.

According to the system and method disclosed herein, the present invention can provide a soft, high saturation magnetic flux density CoNiFe film suitable for use in write heads.

DETAILED DESCRIPTION OF THE INVENTION

The present invention relates to an improvement in magnetic recording technology. The following description is presented to enable one of ordinary skill in the art to make and use the invention and is provided in the context of a patent application its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for plating CoNiFe. The method and system include providing a plating solution including hydroxymethyl-p-tolylsulfone and plating the CoNiFe film on a substrate in the plating solution. The plating solution is configured to provide a CoNiFe film having a high saturation magnetic flux density and having a composition of fifty through seventy weight percent of Fe and three through eight weight percent of Ni. In another aspect, the method and system include plating at least a portion of a first and/or second pole of a write head using the plating solution including hydroxymethyl-p-tolylsulfone and configured to plate the CoNiFe film having a high saturation magnetic flux density and a composition of fifty through seventy weight percent of Fe and three through eight weight percent of Ni.

The present invention will be described in terms of particular properties for CoNiFe films. However, one of ordinary skill in the art will readily recognize that the method and system can be used to provide CoNiFe films having other properties not inconsistent with the present invention. The present invention is also described in the context of particular constituents and particular concentrations of constituents in the plating solution, such as hydroxymethyl-p-tolylsulfone. However, one of ordinary skill in the art will readily recognize that other and/or additional constituents other concentrations not inconsistent with the present invention. The present invention is also described in the context of a write head. However, one of ordinary skill in the art will readily recognize that the write head may be incorporated into a merge head and that the CoNiFe films may be used for other purposes. Furthermore, one of ordinary skill in the art will readily recognize that the figures herein are for the purposes of illustration only and thus are not drawn to scale.

Figure 1:
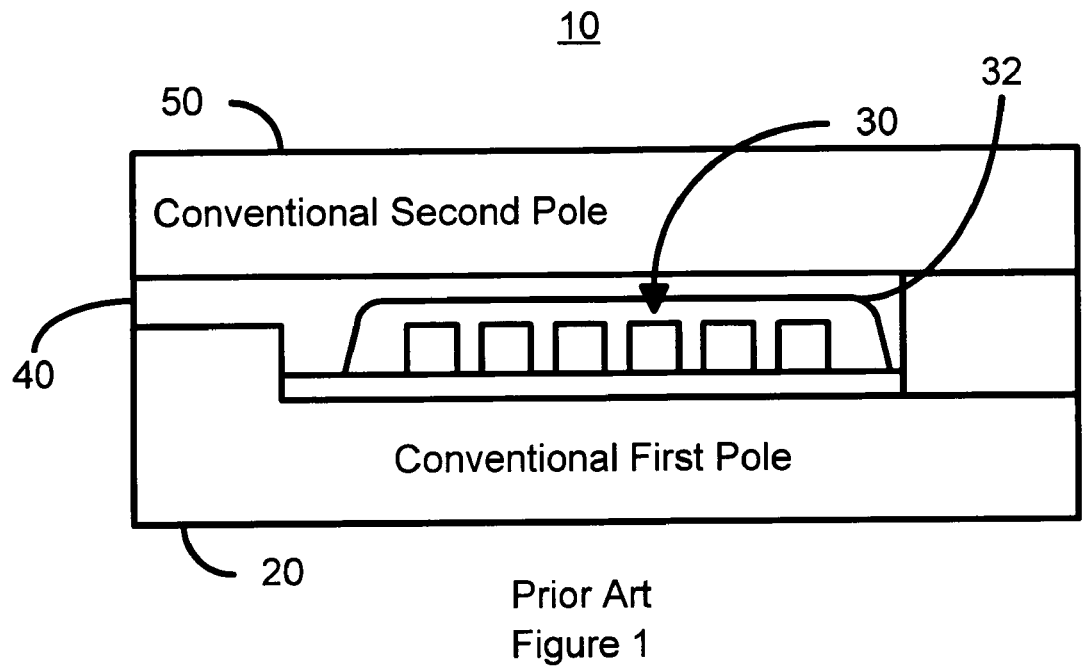
FIG. 1 is a diagram of a conventional magnetic write head formed using conventional materials.
Figure 2:
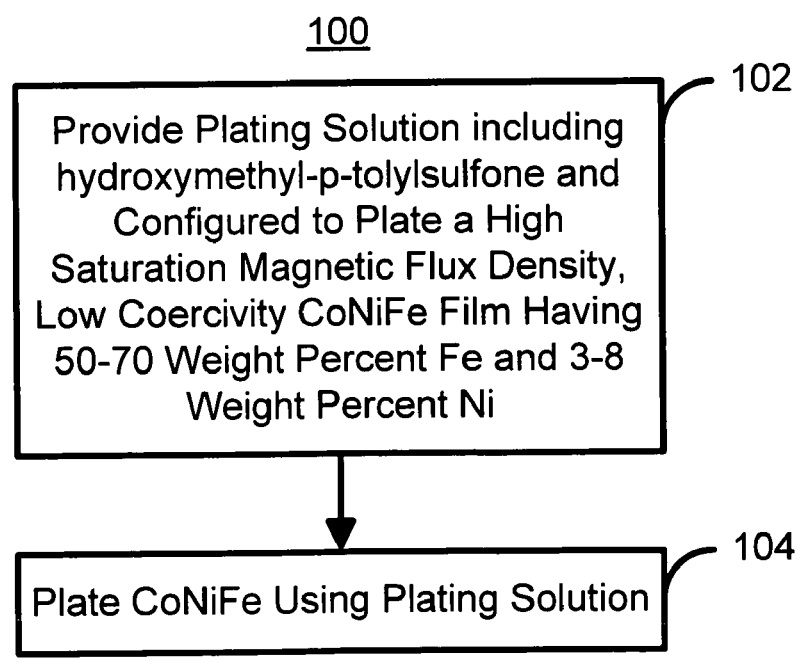
FIG. 2 is a high-level flow chart depicting one embodiment of a method in accordance with the present invention for providing a plated CoNiFe film.

To more particularly illustrate the method and system in accordance with the present invention, refer now to FIG. 2, depicting one embodiment of a method 100 in accordance with the present invention for providing a plated CoNiFe film. The method 100 is preferably used in plating CoNiFe for write heads. However, the method 100 may be used in plating CoNiFe for other purposes.

A plating solution including hydroxymethyl-p-tolylsulfone is provided, via step 102. The plating solution is configured to provide a CoNiFe film having a high saturation magnetic flux density ($B_{sat}$) and having a composition of fifty through seventy weight percent of Fe and three through eight weight percent of Ni. As used herein, a high $B_{sat}$ is greater than or equal to two Tesla. In a preferred embodiment, the plating solution is configured to plate a CoNiFe film having a composition of fifty-eight through sixty-two weight percent of Fe and three and a half to four weight percent of Ni. Also in a preferred embodiment, the plating solution is configured such that the resulting CoNiFe film is soft. As used herein, a soft film has a coercivity of less than thirty Oe. In a preferred embodiment, the plating solution is also configured to provide a CoNiFe film having a low perpendicular anisotropy field ($H_k$). As used herein, a low $H_k$ is less than approximately forty Oe. In order to provide the CoNiFe films described above, the plating solution preferably includes $CoSO_4$, $NiSO_4$, $FeSO_4$, $NH_4Cl$, boric acid, Sodium lauryl sulfate, and saccharin in addition to hydroxymethyl-p-tolylsulfone. Moreover, step 102 preferably includes maintaining the plating solution at a pH of less than three and preferably substantially 2.8. However, in another embodiment a pH of three to five may be maintained. Step 102 also preferably includes maintaining the plating solution at a desired temperature, for example approximately eighteen degrees Celsius.

A CoNiFe film having the desired properties is plated on a substrate in the plating solution, via step 104. Step 104 continues until a CoNiFe having the desired thickness is achieved. In a preferred embodiment, the CoNiFe film is being plated for a write head (not shown in FIG. 2). In such an embodiment, the substrate includes the structures under the first and/or second pole.

Using the method 100, a CoNiFe film having the desired composition and magnetic properties can be provided. In a preferred embodiment, the CoNiFe film has a composition of fifty-eight through sixty-two weight percent of Fe and three and a half through four weight percent of Ni. In such an embodiment, a high $B_{sat}$ of greater than 2.2 Tesla may be achieved form some compositions. The CoNiFe film is also soft. In the preferred embodiment, the plated CoNiFe film has a hard axis coercivity of less than or equal to two Oe, an easy axis coercivity of less than or equal to six Oe and the preferred composition described above. Thus, the CoNiFe film plated using the method 100 is suitable for use in a write head. Moreover, the CoNiFe may have better corrosion resistance than CoFe. Note, however, that the CoNiFe plated using the method 100 may not have corrosion resistance as high as other CoNiFe films. In a preferred embodiment, the method 100 also produces a low plated CoNiFe film having a low $H_k$ of less than approximately thirty-five Oe.

Figure 3:
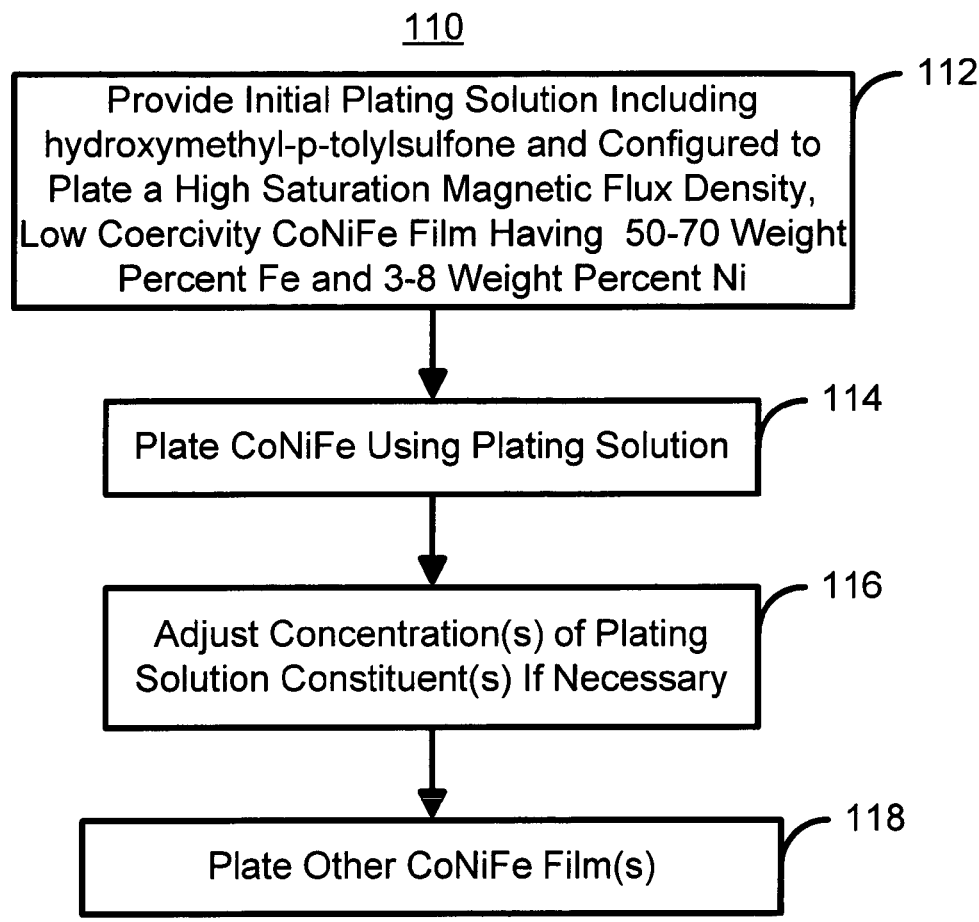
FIG. 3 is a more detailed flow chart depicting one embodiment of a method in accordance with the present invention for providing plated CoNiFe films.

FIG. 3 is a more detailed flow chart of one embodiment of a method 110 for plating high $B_{sat}$, soft CoNiFe films in accordance with the present invention. An initial plating solution including hydroxymethyl-p-tolylsulfone is provided, via step 112. The plating solution provided in step 112 is analogous to the plating solution provided using step 102 of the method 100. Thus, the plating solution is configured to plate a high $B_{sat}$, preferably soft CoNiFe film that preferably also has a low $H_k$. In a preferred embodiment, the initial composition of the plating solution is: fifteen g/l $CoSO_4 7H_2O$, twenty-two to thirty g/l $NiSO_4 6H_2O$, zero to forty-five g/l $FeSO_4 7H_2O$, fifteen g/l $NH_4Cl$, twenty g/l boric acid, 0.01 g/l sodium lauryl sulfate, 0.1 g/l saccharin, and 0.005-0.025 g/l hydroxymethyl-p-tolylsulfone. Also in a preferred embodiment step 112 includes maintaining the plating solution at a pH of approximately 2.8 and a temperature of approximately eighteen degrees Celsius.

A CoNiFe film is plated on a substrate in the plating solution, via step 114. In a preferred embodiment, the CoNiFe film is being plated for a write head (not shown in FIG. 3). In such an embodiment, the substrate includes the structures under the first and/or second pole. Moreover, step 114 is continued until the desired thickness of CoNiFe film is achieved.

The concentration of constituents in the plating solution is adjusted to maintain the plating of the CoNiFe film having the desired composition, the desired $B_{sat}$, and preferably the desired softness and $H_k$, via step 116. Thus, once one or more films have been plated in step 114, the plating solution is tuned so that the plating solution will still be configured to provide CoNiFe films having the desired properties. At least one more CoNiFe film is plated using the updated plating solution, via step 118. In a preferred embodiment, the conditions under which the CoNiFe film is plated in step 118 are substantially the same as for the CoNiFe film plated in step 114.

Using the method 110, CoNiFe films having the desired composition, magnetic properties, and other properties can be obtained. In a preferred embodiment, the CoNiFe films have a composition of fifty-eight through sixty-two weight percent of Fe and three and a half through four weight percent of Ni. In such an embodiment, a high $B_{sat}$ of greater than 2.2 Tesla may be achieved form some compositions. The CoNiFe films plated using the method 110 are also preferably soft. In the preferred embodiment, the plated CoNiFe film has a hard axis coercivity of less than or equal to two Oe, an easy axis coercivity of less than or equal to six Oe. In one embodiment, the method 100 also produces a low plated CoNiFe film having a low $H_k$ of less than approximately thirty-five Oe. In a preferred embodiment, the plated CoNiFe film has a low $H_k$ of less than approximately twenty Oe. Moreover, the CoNiFe may have better corrosion resistance than CoFe. Note, however, that the CoNiFe plated using the method 110 may not have corrosion resistance as high as other CoNiFe films.

The properties of CoNiFe films plated using the method 100 and/or 110 can be seen from FIGS. 4A-4G. FIGS. 4A-4G are graphs depicting the properties of CoNiFe films versus Fe concentration for CoNiFe films plated using methods 100 and/or 110 in accordance with the present invention. For the graphs depicted in FIGS. 4A-4G, the CoNiFe films were plated using paddle cells having a one hundred and twenty or three hundred and twenty liter capacity, at a current density of three to four $mA/cm^2$, and plating solutions having the constituents at the concentrations listed above. In addition, the plating substrates for the data depicted in FIGS. 4A-4G were Si wafers having a one thousand Angstrom CoNiFe (40/5/55) seed layer. The CoNiFe films were also annealed in an atmosphere of $H_2N_2$ (five percent $H_2$) under a two thousand Gauss magnetic field. Furthermore, thermal annealing including a two hundred and eighty minute soaking period at one hundred and twenty-five degrees Celsius follows by another soaking period at two hundred and thirty degrees Celsius. For these soaking periods heating and cooling rates of one degree Celsius per minute and on half degree Celsius per minute, respectively, were used. Furthermore, data for varying concentrations of hydroxymethyl-p-tolylsulfone are shown. The Ni content in the films ranged between three and twelve weight percent, with decreased Ni content for increased Fe content. For example, films having a sixty weight percent Fe content have a Ni content of approximately three and a half to four weight percent of Ni.

Figure 4A:
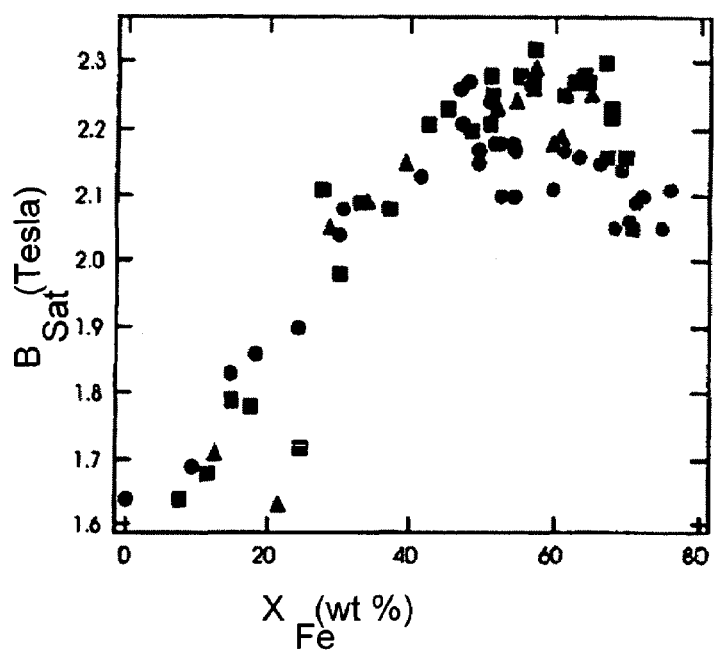
FIGS. 4A-4G are graphs depicting the properties of CoNiFe films versus Fe concentration for CoNiFe films plated using methods in accordance with the present invention.

FIG. 4A depicts a graph 150 of the magnetic flux density saturation, $B_{sat}$, versus Fe concentration in weight percent for CoNiFe films plated in accordance with the methods 100 and/or 110 using varying concentrations of hydroxymethyl-p-tolylsulfone. As can be seen from the graph 150, the highest $B_{sat}$ values were obtained for CoNiFe films in the range of fifty-eight through sixty-two weight percent Fe and three and a half through four weight percent of Ni. In particular, a $B_{sat}$ value of up to 2.3 T was achieved. Moreover, high $B_{sat}$ values (above two Tesla) were obtained in a broader range of Fe and Ni concentrations.

Figure 4B:
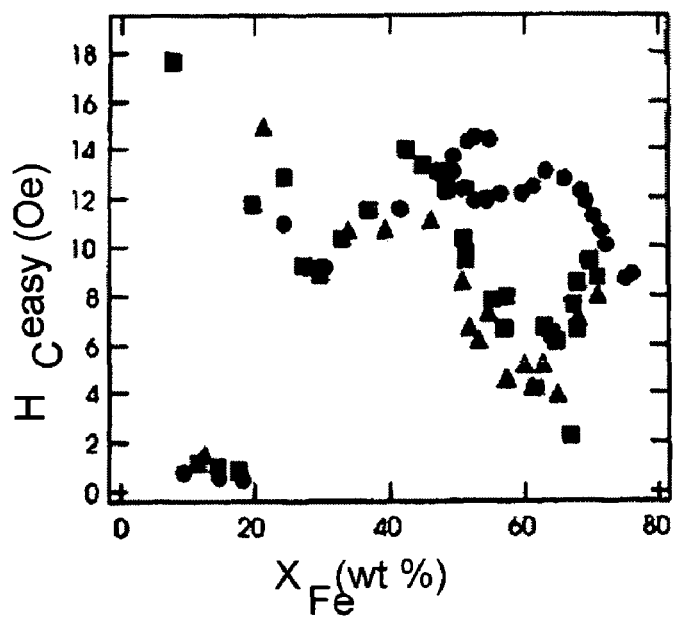
Figure 4C:
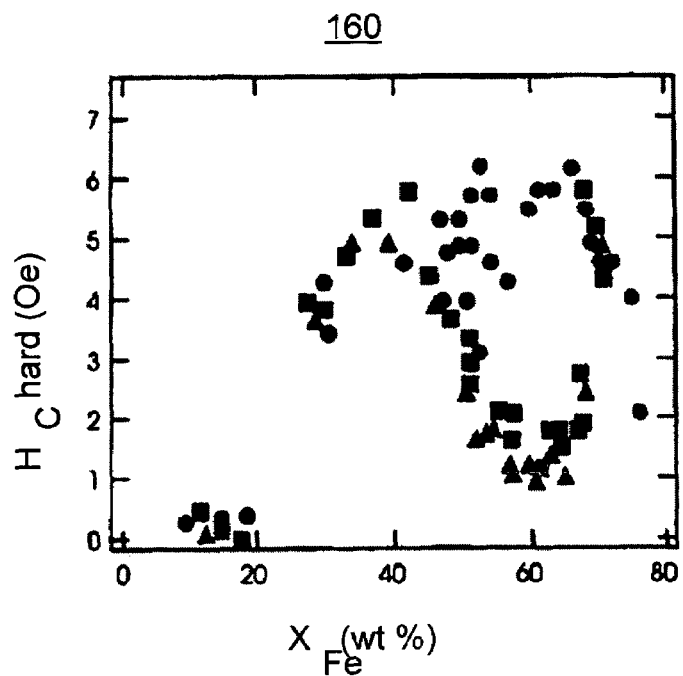

FIGS. 4B and 4C depicts graphs 155 and 160 of the easy axis coercivity, $H_{c\ easy}$, and the hard axis coercivity, $H_{c\ hard}$, respectively, versus Fe concentration in weight percent for CoNiFe films plated in accordance with the methods 100 and/or 110 using varying concentrations of hydroxymethyl-p-tolylsulfone. Graphs 155 and 160 indicate that in the concentrations of Fe and Ni having the highest $B_{sat}$, the CoNiFe films remain soft. For example, for films in the range of fifty-eight through sixty-two weight percent Fe and three and a half through four weight percent of Ni had $H_{c\ easy}$ and $H_{c\ hard}$ values as low as four Oe and one Oe, respectively. Furthermore, CoNiFe films plated using higher hydroxymethyl-p-tolylsulfone concentration, fifteen parts per million hydroxymethyl-p-tolylsulfone or greater, had the smallest coercivity. It is believed that the improved softness of the CoNiFe films is due to lower crystallite size of films grown using the plating solution of the methods 100 and 110 containing hydroxymethyl-p-tolylsulfone. Moreover, as discussed below with respect to Table 1, films plated at higher concentrations of hydroxymethyl-p-tolylsulfone resulted in a greater decrease in coercivities over films plated in the absence of hydroxymethyl-p-tolylsulfone.

Figure 4D:
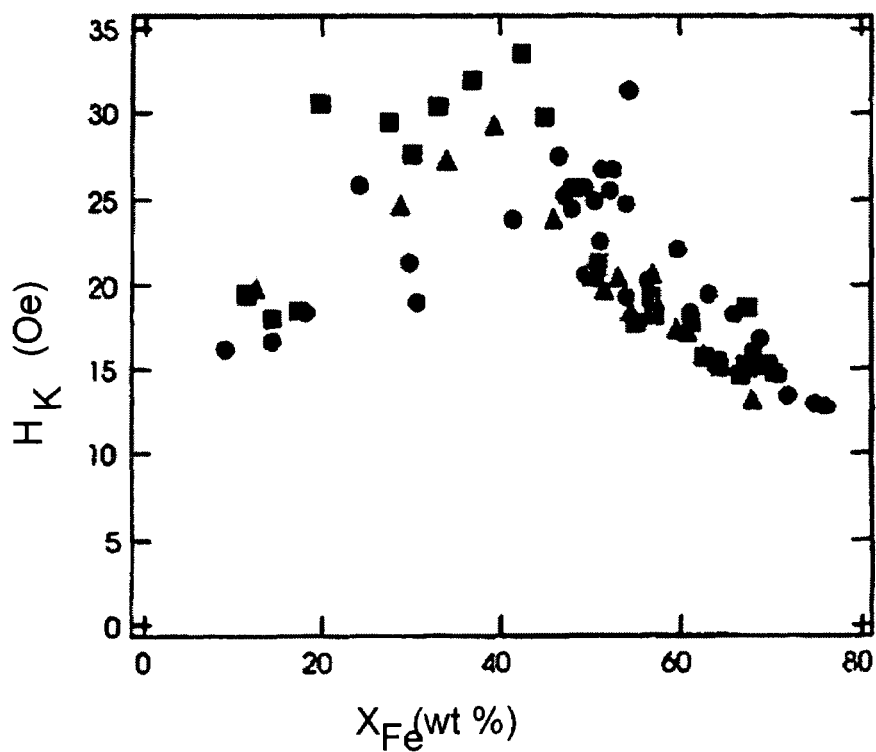

FIG. 4D depicts a graph 165 of the hard axis anisotropy field, HK, versus Fe concentration in weight percent for CoNiFe films plated in accordance with the methods 100 and/or 110 using varying concentrations of hydroxymethyl-p-tolylsulfone. As can be seen from the graph 165, the anisotropy of the CoNiFe films plated using hydroxymethyl-p-tolylsulfone remains low, less than thirty-five Oe. Even for those films in the composition range of particular interest, fifty-eight through sixty-two weight percent Fe and three and a half through four weight percent of Ni, an anisotropy field generally in the range of sixteen to twenty five can be obtained.

Figure 4E:
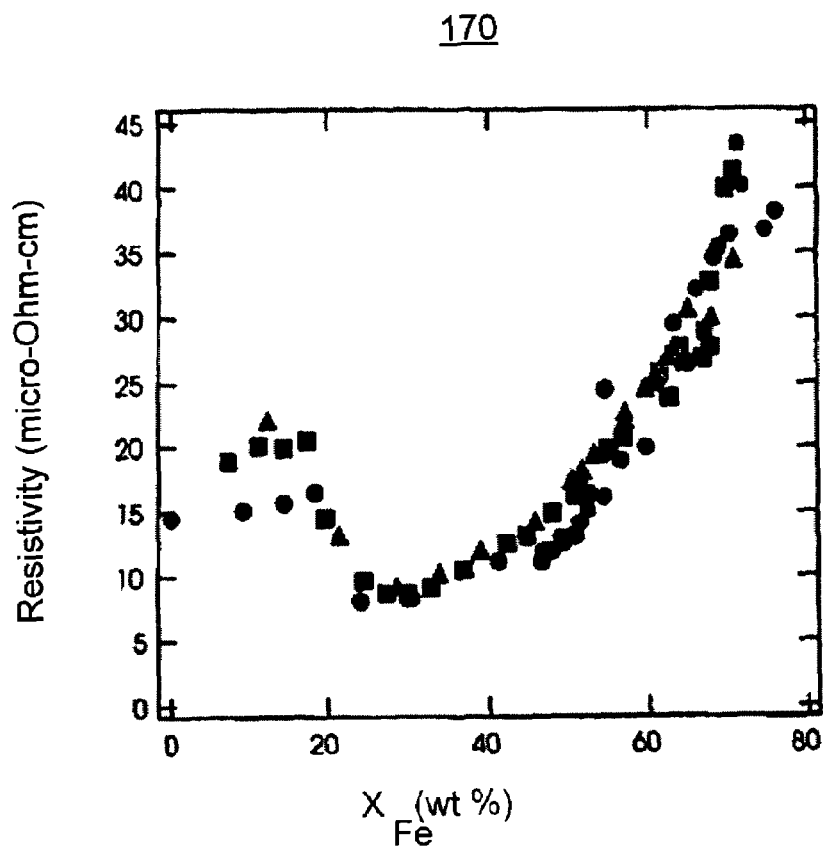

FIG. 4E depicts a graph 170 of the resistivity versus Fe concentration in weight percent for CoNiFe films plated in accordance with the methods 100 and/or 110 using varying concentrations of hydroxymethyl-p-tolylsulfone. As can be seen from the graph 170, the anisotropy of the CoNiFe films plated using hydroxymethyl-p-tolylsulfone remains relatively low. Even for those films in the composition range of particular interest, fifty-eight through sixty-two weight percent Fe and three and a half through four weight percent of Ni, a resistivity value of approximately twenty-five micro-Ohm-cm can be obtained. Thus, an improvement in magnetic properties without a substantial degradation in the resistivity can be achieved for CoNiFe films plated using the methods 100 and/or 110.

Figure 4F:
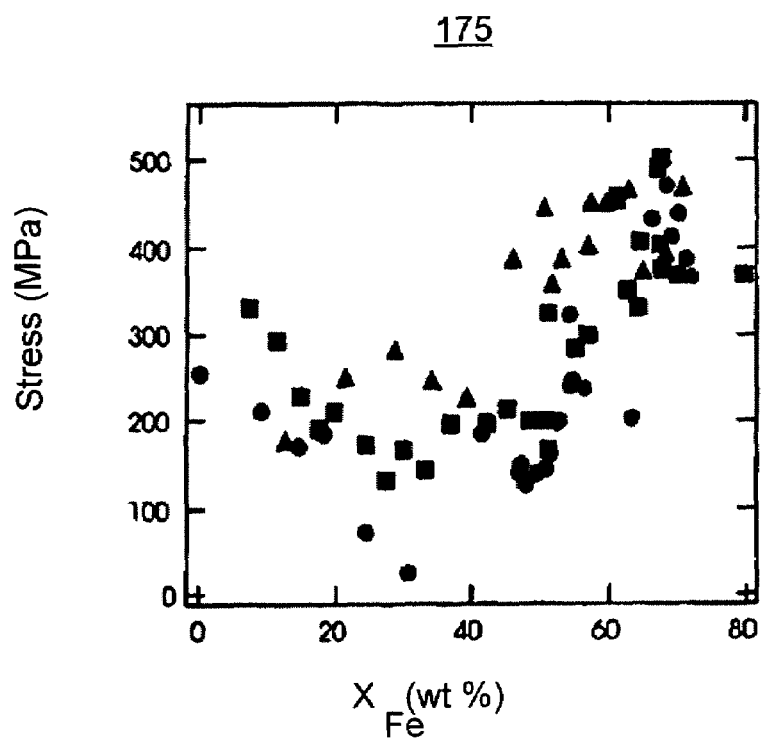

FIG. 4F depicts a graph 175 of the stress versus Fe concentration in weight percent for CoNiFe films plated in accordance with the methods 100 and/or 110 using varying concentrations of hydroxymethyl-p-tolylsulfone. As can be seen from the graph 175, the stress of the films increases with Fe content greater than fifty weight percent. In particular, a stress in the range of four hundred and fifty MPa is observed for those films in the composition range of particular interest, fifty-eight through sixty-two weight percent Fe and three and a half through four weight percent of Ni. In this composition range having the highest $B_{sat}$, the plated films may exhibit delamination at thicknesses on the order of 3.5 microns. However, for thinner films, on the order of one micron or less, the stress should not adversely affect performance of the plated CoNiFe films.

Figure 4G:
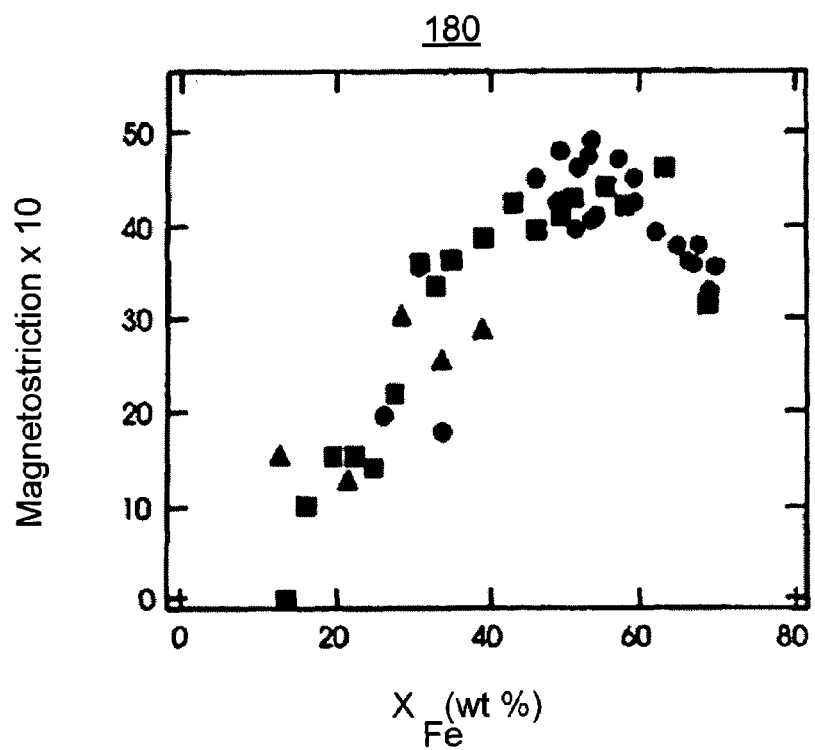

FIG. 4G depicts a graph 180 of the stress versus Fe concentration in weight percent for CoNiFe films plated in accordance with the methods 100 and/or 110 using varying concentrations of hydroxymethyl-p-tolylsulfone. As can be seen from the graph 175, the magnetostriction of the films increases with Fe content greater than fifty weight percent. In particular, a magnetostriction in the range of $45 \times 10^{-6}$ is observed for those films in the composition range of particular interest, fifty-eight through sixty-two weight percent Fe and three and a half through four weight percent of Ni. However, for thinner films, on the order of one micron or less, the magnetostriction should not adversely affect performance of the plated CoNiFe films.

Thus, plating CoNiFe using the solution described above and the methods 100 and/or 110, a CoNiFe having the desired properties can be achieved. In particular, CoNiFe films having a high $B_{sat}$, low coercivity, low anisotropy field and a substantially unaffected resistivity can be produced using the method 100 and/or 110. However, thinner films, on the order of one micron or less, may be desirable. The benefits of using the method 100 and/or 110 further can be seen in a comparison of films not using the method 100 or 110 (e.g. without hydroxymethyl-p-tolylsulfone) and films plated using the method 100 or 110. Table 1 further summarizes the benefits of the method 110 and the system 110. In particular, films which have a high $B_{sat}$ in conjunction with low coercivities, and in some instances low HK, can be obtained. Thus, write heads having improved properties may be obtained using the method 100 and/or 110.

TABLE 1

| Film | hydroxymethyl-p-tolylsulfone (ppm) | % Ni (wt) | % Fe (wt) | $B_{sat}$ (T) | $H_{ceasy}$ (Oe) | $H_{chard}$ (Oe) | $H_k$ (Oe) | ρ (mΩ-cm) | Stress (MPa) | λ |
| --- | --- | --- | --- | --- | --- | --- | --- | --- | --- | --- |
| 2.2T CoNiFe | 0 | 4.5-5.5 | 50-53 | 2.2 | 10-12 | 6-8 | 24-28 | 12-14 | 150-250 | $4.5 \times 10^{-6}$ |
| 2.3T CoNiFe | 15-25 | 3.5-4 | 58-62 | 2.3 | 4-7 | 1-2 | 15-28 | 20-25 | 300-450 | $4.5 \times 10^{-6}$ |

Figure 5:
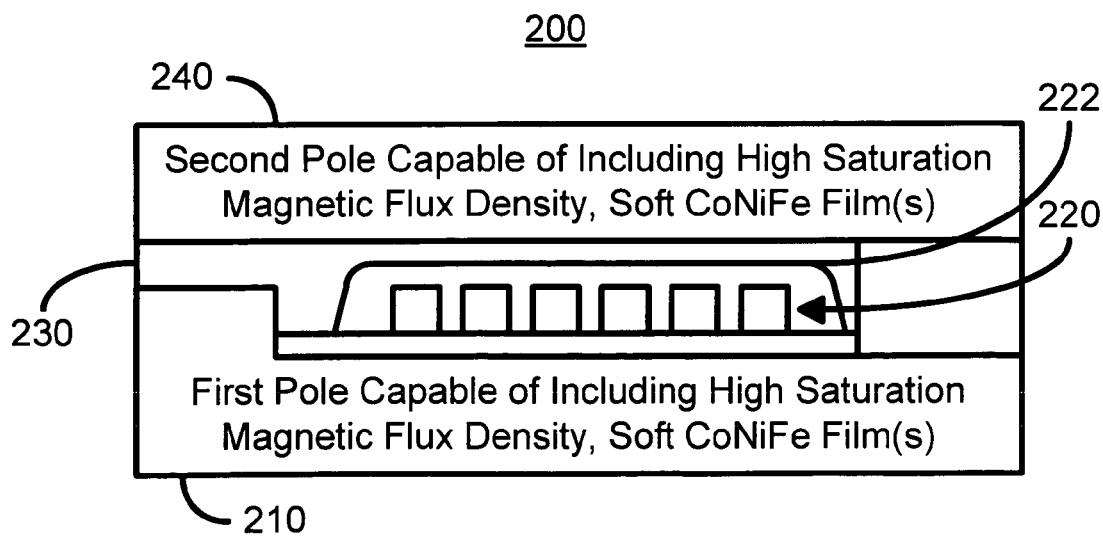
FIG. 5 is diagram depicting one embodiment of a write head including CoNiFe films plated using methods in accordance with the present invention.

FIG. 5 depicts one embodiment of a write head 200 including CoNiFe films plated using methods in accordance with the present invention. The write head includes a first pole (P1) 210, a write coil 220 insulated by insulating layer 222, a write gap 230, and a second pole (P2) 240. The write coil 220 is used to carry a coil which energizes P1 210 and P2 240 during writing. The insulating layer 222 is typically a hardbaked photoresist. The P1 210 and the P2 240 are separated by the write gap 230 in the region of the pole tip. At least a portion of the P1 210 and/or the P2 240 include CoNiFe film(s) fabricated using the method 100 and/or 110. In a preferred embodiment, only a small portion, less than approximately one micron in thickness, of the P1 210 and/or the P2 240 includes the CoNiFe film(s) described herein in order to reduce possible adverse affects due to magnetostriction and/or stress.

Because CoNiFe films fabricated with the method 100 and/or 110 are used for P1 210 and/or P2 240, the poles 210 and/or 240 exhibit desirable characteristics. In particular, the poles 210 and/or 240 may have improved $B_{sat}$, improved softness, and lower anisotropy fields. Moreover, the resistivity may be substantially unaffected. Consequently, performance of the write head 200 can be improved.

A method and system has been disclosed for plating a high magnetic flux density saturation, low coercivity CoNiFe layer. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetic recording head comprising:
   a first pole;
   a second pole;
   a write coil, at least a portion of the write coil residing between the first pole and the second pole;
   a write gap residing between a part of the first pole and a part of the second pole;
   wherein at least a portion of at least one of the first pole and the second pole is plated using a plating solution including hydroxymethyl-p-tolylsulfone (HPT), the plating solution being configured to such that the at least the portion includes a CoNiFe film having a high saturation magnetic flux density of greater than 2.2 Tesla and having a composition of 58-62 weight percent of Fe and 3.5-4 weight percent of Ni, the CoNiFe film having a thickness of not more than one micron.

2. The magnetic recording head of claim 1 wherein the CoNiFe film is a soft magnetic film.

3. The magnetic recording head of claim 2 wherein the CoNiFe film has a hard axis coercivity of less than or equal to two Oe and an easy axis coercivity of less than or equal to six Oe.

4. The magnetic recording head of claim 1 wherein the CoNiFe film has a low perpendicular anisotropy field of less than thirty five Oe.

5. The magnetic recording head of claim 1 wherein the CoNiFe film has a low perpendicular anisotropy field of less than twenty Oe.

* * * * *